UNITED STATES PATENT OFFICE 2,481,597

SUBSTITUTED PROPIONIC ACIDS AND PROCESSES OF PREPARING THE SAME

Oscar H. Johnson, Medina, N. Y., assignor to Merck & Co., Inc., Rahway, N. J., a corporation of New Jersey No Drawing. Application November 19, 1946, Serial No. 710,945

5 Claims. (Cl. 260—465.5)

This invention is concerned generally with novel chemical compounds, and with processes for preparing the same; more particularly it relates to α-phenylacetamido-β,β-diethoxy-propionic acid, an important intermediate in the synthesis of penicillin and other compounds, and with intermediate products and processes employed in synthesizing the same from readily available starting materials. The new compounds are further useful in the preparation of serine, an important amino acid. They can also be used in studying and elucidating the structure of other more complex organic substances.

Applicant has discovered that α-phenylacetamido-β,β-diethoxy propionic acid can be synthesized by reactions indictaed generically as follows:

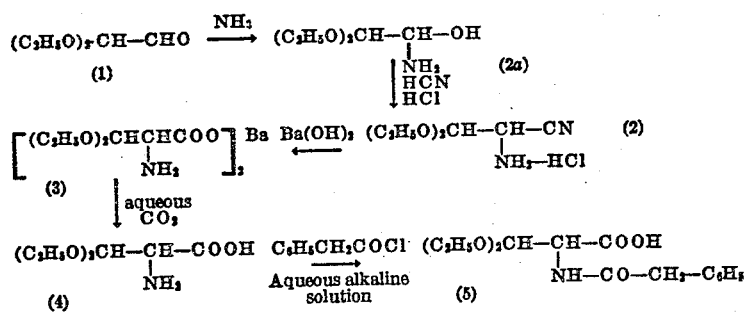

The reactions indicated above are conducted as follows: glyoxal semi diethyl acetal (1) is reacted with gaseous ammonia to produce α-amino-β,β-diethoxy-ethanol (2a); this compound is then treated with hydrocyanic acid and the product treated with alcoholic HCl to produce the hydrochloride of α-amino-β,β-diethoxy-propionitrile (2); this compound is reacted with aqueous barium hydroxide whereby the nitrile grouping is hydrolyzed to form barium α-amino-β,β-diethoxy-propionate (3); this barium salt is then treated in aqueous solution with carbon dioxide, thus precipitating barium carbonate and producing α-amino-β,β-diethoxy-propionic acid (4) in aqueous solution; the solution of the latter compound is then reacted with phenylacetyl-chloride to produce α-phenylacetamido-β,β-diethoxy-propionic acid (5).

When α-phenylacetamido-β,β-diethoxy-propionic acid (5) is heated with acetic anhydride the product obtained is 2-benzyl-4-ethoxymethylene-5(4)-oxazolone, which can be reacted with d-penicillamine to produce penicillin.

In carrying out applicant's novel and improved process, glyoxal semi-diethyl acetal is dissolved in a solvent, such as ether, and the solution saturated with gaseous ammonia. The solvent and excess ammonia are evaporated under reduced pressure leaving the aldehyde-ammonia compound, α-amino-β,β-diethoxy-ethanol, as a waxy solid. Liquid hydrocyanic acid is added whereupon the aldehyde-ammonia compound dissolves, and the resulting solution is stirred for a period of at least about 20 hrs. The reaction mixture is extracted with an organic solvent such as ether, the ether solution is filtered to remove insoluble impurities, dried by conventional methods, as for example, by means of anhydrous sodium sulfate, and evaporated to produce α-amino-β,β-diethoxy-propionitrile. The nitrile is conveniently purified by conversion to the hydrochloride using gaseous hydrogen chloride in alcohol solution; the crude α-amino-β,β-diethoxy-propionitrile hydrochloride which precipitates is recovered by filtration, and further purified by treatment with activated charcoal in aqueous solution; the aqueous solution containing the partially purified hydrochloride is then treated with a mild alkaline material, such as sodium bicarbonate, and the resulting alkaline solution extracted with ether. The ether extract, which contains the α-amino-β,β-diethoxy-propionitrile is then dried and evaporated and the amino-nitrile converted to the hydrochloride as previously described. The hydrochloride of the amino-nitrile can be further purified if desired by recrystallization from a solvent, such as ethylene dichloride-petroleum ether.

The pure α-amino-β,β-diethoxy-propionitrile is hydrolyzed by heating with an aqueous solution of an alkaline earth metal hydroxide, preferably with barium hydroxide, to form the corresponding alkaline earth metal salt of α-amino-β,β-diethoxy-propionic acid. This salt is converted to the free acid by treatment in aqueous solution with an alkaline earth precipitant, such as carbon dioxide, whereupon the alkaline earth metal carbonate precipitates and is separated from the solution containing the α-amino-β,β-diethoxy-propionic acid by filtration or centrifugation.

The filtered aqueous solution containing the free α-amino acid is then reacted with successive portions of phenyl acetyl chloride and a mild alkaline agent, such as sodium bicarbonate, which reacts with the hydrochloric acid formed by the reaction. The resulting α-phenylacetamido-β,β-diethoxy-propionate is recovered from the aqueous reaction solution by any convenient means, as for example, by acidification and extraction with a solvent such as diethyl ether. The ether extract is dried and evaporated and the residual material purified by recrystallization from a solvent, such as ethylene-dichloride-petroleum-ether, to produce substantially pure α-phenacetamido-β,β-diethoxy-propionic acid.

The following examples illustrate a method of carrying out the present invention but it is to be understood that these examples are given by way of illustration and not of limitation.

*Example 1*

Nineteen grams of glyoxalsemidiethylacetal were dissolved in 40 ml. of absolute ether. This solution was cooled and saturated with gaseous ammonia. The ether and excess ammonia were then removed in vacuo leaving the aldehyde ammonia compound as a waxy solid. 12 milliliters of liquid hydrocyanic acid were added and the resulting solution stirred for 20 hours. 150 milliliters of ether were added to the brown mixture and a small amount of insoluble material was removed by filtration. The filtrate was dried over anhydrous sodium sulfate and the ether removed in vacuo. The residue was dissolved in 7 ml. of ethanol and dry hydrogen chloride passed into the solution with stirring. The solution solidified upon cooling.

This crude α-amino-β,β-diethoxypropionitrile hydrochloride was dissolved in 100 ml. of water and filtered through a charcoal mat. Sodium bicarbonate was added to the filtrate until the mixture was slightly alkaline and then the mixture was extracted several times with ether. The combined ether extracts were dried over sodium sulfate and then the mixture cooled while dry hydrogen chloride was introduced. The oil that separated crystallized upon scratching or seeding. This solid was removed by filtration, dissolved in 125 ml. of ethylene dichloride, filtered through a charcoal mat and then diluted with 50 ml. of petroleum ether. The pure α-amino-β,β-diethoxypropionitrile hydrochloride crystallized upon cooling; weight, 9.4 g.; M. P. 126-7° C. The filtrate was diluted with 200 ml. of petroleum ether to yield another crop of 1.3 g.; M. P. 125-6° C.; total yield, 10.7 g. (yield 38% of theory). Anal. Calcd. for $C_7H_{15}N_2O_2Cl$: C, 43.19; H, 7.76; N, 14.39. Found: C, 43.30; H, 7.57; N, 14.43.

*Example 2*

To a solution of 5.7 g. of α-amino-β,β-diethoxy-propionitrile hydrochloride in 190 ml. of water was added 11.4 g. of barium hydroxide monohydrate. The mixture was warmed at 65° C. for 12 hours and was then saturated with carbon dioxide and filtered. The filtrate was treated with successive portions of phenylacetyl chloride and sodium bicarbonate until phenylacetylation of the intermediate α-amino-β,β-diethoxy-propionic acid was complete. The filtered solution was cooled and acidified with hydrochloric acid, then extracted with ether several times. The ether solution was dried over anhydrous sodium sulfate and the ether solution was then evaporated. The residual material was washed several times with petroleum ether to remove phenylacetic acid and was then recrystallized from ethylene dichloride-petroleum ether to produce 2.4 g. of substantially pure α-phenylacetamido-β,β-diethoxy-propionic acid; M. P. 112° C. (corr.); yield 28% of theory; Anal: Calcd. for $C_{15}H_{21}O_5N$: C, 61.01; H, 7.17; N, 4.74. Found: C, 61.20; H, 7.16; N, 4.77.

Modifications may be made in carrying out the present invention without departing from the spirit and scope thereof, and the invention is to be limited only by the appended claims.

I claim:

1. α-Amino-β,β-diethoxy-propionitrile.
2. α-Amino-β,β-diethoxy-propionitrile hydrochloride.
3. The process which comprises saturating an ether solution of glyoxal semidiethyl acetal with gaseous ammonia, evaporating the solvent and excess ammonia, stirring the waxy solid thus obtained with liquid hydrocyanic acid for a period of at least about 20 hours, and treating the resulting product in alcohol solution with gaseous hydrogen chloride to produce α-amino-β,β-diethoxy-propionitrile hydrochloride.
4. The process which comprises saturating an ether solution of glyoxal semidiethyl acetal with gaseous ammonia, evaporating the solvent and excess ammonia, and stirring the waxy solid thus obtained with liquid hydrocyanic acid for a period of at least about 20 hours to produce α-amino-β,β-diethoxy-propionitrile.
5. A compound of the formula:

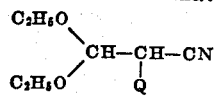

wherein Q is a radical selected from the class which consists of $NH_2$ and $NH_2 \cdot HCl$ radicals.

OSCAR H. JOHNSON.

REFERENCES CITED

The following references are of record in the file of this patent:

UNITED STATES PATENTS

| Number | Name | Date |
|---|---|---|
| 2,394,967 | Kushner | Feb. 12, 1946 |

OTHER REFERENCES

Sidgwick, "Organic Chemistry of Nitrogen," Oxford at the Clarendon Press (1937), pp. 117 and 121.

Abraham et al., "The British Journal of Experimental Pathology," vol. 23, June 1942, p. 111.

Merck Report X, Jan. 31, 1944, p. 9, CPS–No. 132.

Committee etc. "Science," vol. 102, Dec. 21, 1945, p. 628.